United States Patent
Roofe

[15] 3,643,318
[45] Feb. 22, 1972

[54] ASSEMBLY MACHINE AND METHOD
[72] Inventor: Willard I. Roofe, Flint, Mich.
[73] Assignee: General Motors Corporation, Detroit, Mich.
[22] Filed: Aug. 10, 1970
[21] Appl. No.: 62,279

[52] U.S. Cl. .................................29/434, 29/173, 29/200, 74/763
[51] Int. Cl. ..............................B23p 19/00, B23p 13/00
[58] Field of Search ..................29/434, 173, 200; 74/763

[56] References Cited

UNITED STATES PATENTS 2,508,347    5/1950    Marsh........................29/434

Primary Examiner—Thomas H. Eager
Attorney—W. E. Finken, A. M. Heiter and Charles R. White

[57] ABSTRACT

Machine and method for assembly of workpieces such as primary and secondary weights of a transmission governor. Leading edge of the top flange of the primary weight is used to compress the coil spring seated on the secondary weight. An insert slide wipes the secondary weight and spring off of a carrier to assemble the secondary weight inside of the primary weight and to load the spring internally between the weights.

5 Claims, 7 Drawing Figures

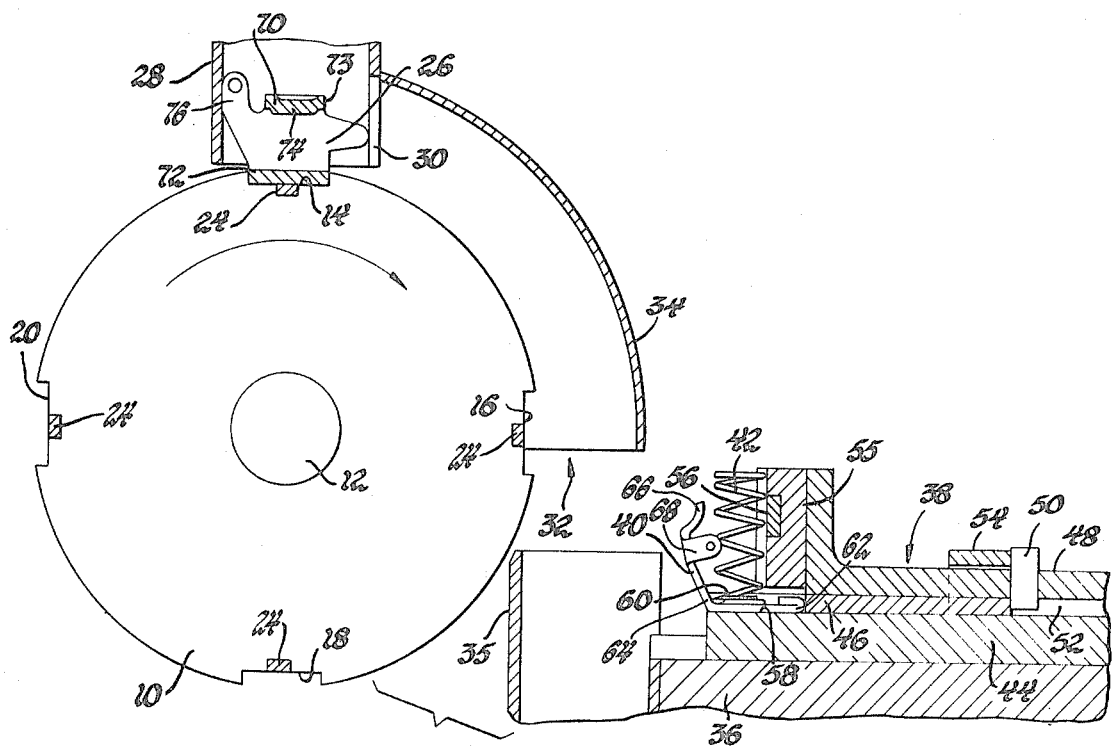
Fig. 1
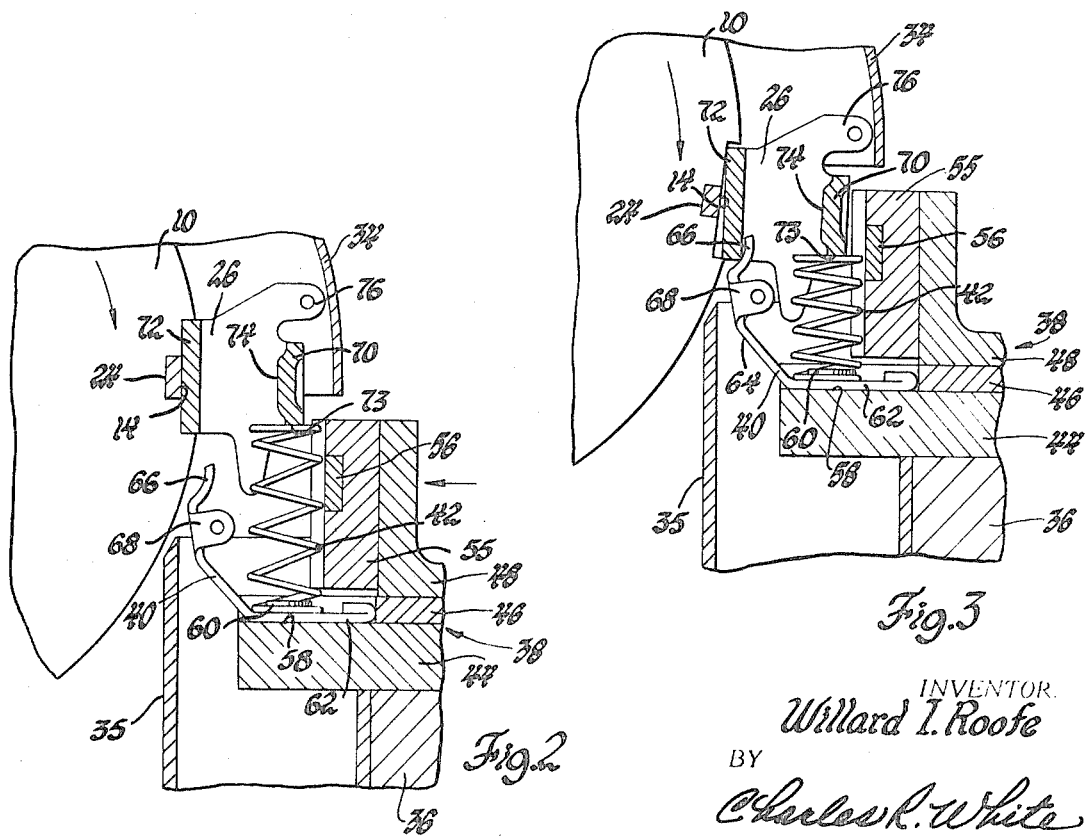
Fig. 2
Fig. 3
INVENTOR.
Willard I. Roofe
BY
Charles R. White
ATTORNEY

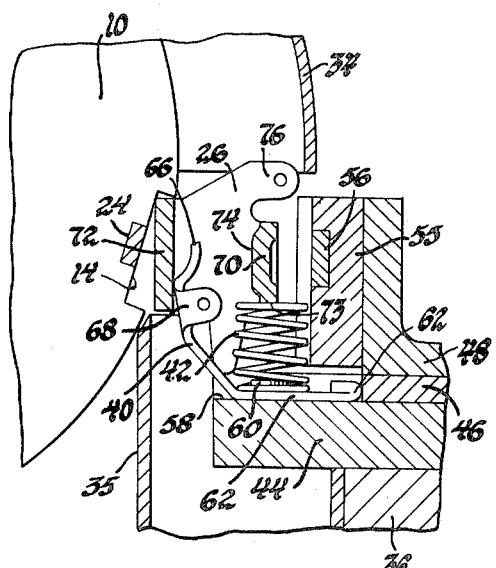

ASSEMBLY MACHINE AND METHOD

This invention relates to a machine and method for assembling component parts such as the primary and secondary weights and a coil preload spring of a two-stage governor.

Many automatic transmission controls employ a two-stage governor to tailor the governor pressure curve to improve transmission control. The two-stage governor generally has primary and secondary weights with a preload coil spring disposed therebetween. The secondary weight is arranged inside of the primary weight so that it acts directly on the governor regulator valve and the primary weight acts through the spring on the secondary weight. At a predetermined transmission output speed the primary weight reaches a stop so that only the secondary weights and springs act on the regulator valve to extend the useful speed range of the governor.

Before the present invention the assembly of two-stage transmission governors was a tedious, time-consuming, manual operation. Usually special fixtures were employed to hold the governor parts as the weights were manually fitted to their carrier and a cap was installed to secure the weights to the carrier. The preload spring was then manually loaded into a spring-retaining fixture and the governor was moved into the fixture to effect the installation of the spring between the primary and secondary weights.

U.S. application Ser. No. 811,439 to Henri J. Van Lent et al., filed Mar. 29, 1969, now U.S. Pat. No. 3,541,887, discloses a typical two-stage governor with primary and secondary weights suitable for assembly by the machine and method of this invention.

This invention provides a new and improved machine and method for connecting the primary and secondary weights with the coil preload spring as a subassembly so that these parts can be subsequently joined as a unit to the carrier. With this invention a primary weight is moved by a mechanical transfer device from a loading station to the assembly station, a coil spring is then loaded on the spring retainer seat on a secondary weight which is mounted on a double-acting slide. The slide positions the secondary weight in a predetermined position for assembly operation adjacent to the transfer device so that the primary weight can compress the coil spring as it moves beyond a predetermined point. An insert slide carried by the slider is moved axially to cause the secondary weight to be cammed inside of the primary weight. The spring is moved from engagement with the top flange of the primary weight and will begin to relax and engage a seat on the inside of the top flange of the primary weight. As the secondary weight is further moved vertically, it recompresses the spring and the spring will effectively hold the primary and secondary weights in an assembled position ready for subsequent assembly with the carrier and valve subassembly.

These and other objects, features and advantages will become more apparent from the following detailed description and drawings in which:

FIG. 1 is a side diagrammatical view of the assembly machine of this invention.

FIGS. 2–7 are side views showing a portion of FIG. 1 to illustrate the operation of the machine and the preferred method of assembly of the primary and secondary weights and the preload coil spring.

As shown in FIG. 1 there is a rotatable four-station transfer wheel 10 driven by a motor through drive shaft 12. The transfer wheel has seats 14, 16, 18 and 20 each provided with a magnet such as magnet 24 for seat 14 to hold metal workpieces such as the primary weights 26 of a two-stage governor. There is a loading chute 28 having a suitable escapement device, such as that shown in U.S. Pat. No. 3,473,676, issued Oct. 21, 1969 to J. D. Cotney, for serially feeding the primary weights 26 into the seats 14–20 as the seats are moved into a loading position beneath the chute. The chute 28 has a suitable opening 30 formed therein to permit the transfer wheel to move the primary weights 26 from the loading station to an assembly station 32. The lever has an outer shroud 34 which provides a cover for the transfer wheel and for the primary weights as they are moved from the loading station to the assembly station. A tubular discharge chute 35 is employed to feed the workpieces after assembly from the machine to a storage hopper or other device for subsequent assembly.

The preferred embodiment has a suitable support or table 36 to which chute 35 is attached and on which is mounted a longitudinally movable slide assembly 38 for transferring second and third workpieces formed by secondary weight 40 and a coil spring 42 from a second loading station to the assembly station 32. The slide assembly comprises a carrier member 44 mounted for axial sliding movement in a suitable channel or groove in the support 36. Slidably mounted on the carrier member 44 are an intermediate or injector slide 46 and a top plate 48. A strap 54 extends from carrier member 44 and loops over slide 46 and plate 48 to retain these slidable elements on the carrier member. The top plate carries a pin 50 which projects downwardly into an elongated slot 52 formed in the intermediate slide 46. The rearwardly extending portions of the components of the slide assembly provide handle means for moving the slide assembly axially. The top plate 48 has a vertically extending front portion 55 which is provided with a magnet 56 that holds the preload coil spring 42 in position on the top slide. The carrier member 44 has a forward upper surface that forms a seat 58 for the secondary weight as the slide assembly is moved to transfer the secondary weight and spring from the loading position illustrated in FIG. 1 to the assembly station 32.

The secondary weight 40 has a spring-retaining boss 60 formed on the inside of one of its legs 62 on which coil spring 42 is seated when it is loaded on the secondary weight. The other leg 64 extends obliquely from leg 62 and has a vertically extending portion that terminates in an inwardly curved tip 66 which provides the mechanical contact for the governor valve element. Leg 64 has ear members 68 each with an opening for reception of a pin to movably secure the primary and secondary weights to each other and to the carrier and cap. The primary weight has spaced upper and lower flanges 70 and 72 to receive the secondary weight and allow pivotal movement of the secondary weight relative to the primary weight. The top flange 70 has a front edge 73 used to compress the preload spring in the preferred way of practicing the method of this invention. Also the top flange 70 has an inner boss 74 to provide a retaining seat for spring 42 when installed. The primary weight has spaced ears 76 each with an opening 78 to receive the pivot pin used to attach the weights to the carrier and cap.

In a preferred operation a primary weight 26 is fed from a hopper or other suitable supply through the loading chute 28 onto a seat on the transfer wheel 10 as the secondary weight is fed onto the seat 58 of the slide member 44 in the loading position. At this time the coil spring 42 is fed by a suitable loading device onto the boss 74 of the secondary weight and it is held in this position by the magnet 56. Manually or by suitable motor means, not shown, the slide assembly 38 is then moved axially as a unit to the left moving the secondary weight and spring. With this movement the coil spring 42 is positioned in alignment with the front edge 73 of the top flange of the primary weight as it is moved close to the assembly station as shown in FIG. 2. The curved tip 66 of leg 64 of the secondary weight is positioned just inside of the front edge of the bottom flange 72 of the primary flange so that the secondary weight will enter into the space between the flanges 70 and 72 as the transfer wheel 10 continues turning to compress spring 42 as best shown in FIG. 3.

FIG. 4 shows the transfer wheel stopped at the assembly station. The coil spring 42 is compressed and moved from the magnet 56 by the primary weight and leg 64 of the secondary weight has been further positioned between the top and bottom flanges of the primary weight.

After spring compression the injector slide 46 is moved by a suitable motor axially relative to top plate 48 and carrier member 44 to begin wiping the secondary weight off of seat 58 on the carrier 44. As shown in FIG. 5 leg 64 of the secondary weight is further inserted into the primary weight and the spring 42, as it is pushed off of the edge 73, will relax and begin to seat on the inner boss 74 of the top flange 70 of the primary weight. FIG. 6 illustrates the end of travel of the injector slide 46 as limited by pin 50 and slot 52; the secondary weight has been pushed completely into the primary weight and the coil spring is compressed between the primary and secondary weights to hold the weights together to form a subassembly. As illustrated in FIG. 7 the slide assembly 38 is being retracted to pick up another secondary weight and spring. The transfer wheel 10 is then turned and the inner wall of the discharge chute wipes the subassembly of the weights and spring from the wheel 10 and this chute delivers the subassembly to a container or conveyor for further operation such as connection to the carrier member and cap. Transfer wheel 10 has at this time picked up another primary weight in seat 20 for additional assembly operation.

While a preferred method and embodiment of this invention has been shown and described, it will be appreciated that this invention is not limited to the particular construction and method disclosed since others will now be apparent to those skilled in the art. Therefore, this invention is set forth in the following claims.

I claim:

1. In an assembly machine for assembling a spring and two workpieces in a unit comprising a transfer member for moving a first workpiece from a loading station to an assembly station, transfer means supporting a second workpiece, retainer means for holding said spring on said second workpiece, means for moving said transfer means to said assembly station so that said first workpiece can subsequently compress said spring on movement of said first workpiece beyond a predetermined point, and injector means to move said second workpiece and said spring relative to said transfer means to insert said second workpiece and said spring into said first workpiece and thereby compress said spring between said workpieces.

2. In an assembly machine for assembling a coil spring and primary and secondary weights for a transmission governor comprising first and second loading stations, an assembly station, transfer means for transferring a first of said weights from said first loading station to said assembly station, slide means for transferring a second of said weights from said second loading station to said assembly station, said slide means having retainer means for holding said coil spring in a predetermined position on said second weight, means for moving said slide means to a position whereby said spring means is axially aligned with a portion of said first weight so that said first weight can compress said coil spring means, and injector means movably mounted on said slide means for pushing said last-mentioned weight and said spring means within said first-mentioned weight whereby said weights are held together in an assembled position by a force exerted by said spring on said weights.

3. The machine defined in claim 2 wherein said transfer means is a rotatable wheel having a plurality of coplanar seats with holding means for holding said primary weights for serial movement of said primary weights from said first loading to said assembly station, said slide means having a top plate with a front face portion and a baseplate having a seat for said secondary weight, and magnet means in said face portion to retain said coil spring on said secondary weight as said slide means moves said secondary weight and said coil spring to said assembly station.

4. A method of assembling first and second workpieces with spring means comprising the steps of loading said first workpiece on a transfer device, positioning said spring means on said second workpiece, moving said second workpiece and said spring means into a predetermined position for assembly with said first workpiece, transferring said first workpiece by said transfer device to said assembly position and subsequently compressing said spring through an external part of said first workpiece, shifting said second workpiece in an axial direction to move said spring from engagement with said external part of said first workpiece and causing said second workpiece to turn inside of said workpiece so that said spring seats on an internal part of said first workpiece and subsequently is compressed between said workpieces to retain said workpieces in an assembled position.

5. A method of assembling primary and secondary weights with coil spring means comprising the steps of loading said primary weight on a first transfer device, loading said secondary weight on a second transfer device, positioning said coil spring on said secondary weight, moving said second transfer device and said secondary weight and said spring means into a predetermined position for assembly with said primary weight, transferring said primary weight to said assembly position to insert a portion of said secondary weight in said primary weight and to compress said spring through an external part of said primary weight, shifting said secondary weight and said spring in an axial direction relative to said second transfer device to cause said spring to move from engagement with said external part of said primary weight and relax into engagement with internal boss on said primary weight, and moving said secondary weight further within said primary weight so that said spring is recompressed to exert a spring force to retain said weights and said spring in an assembled position.

* * * * *